(12) United States Patent
Mack et al.

(10) Patent No.: US 6,386,763 B1
(45) Date of Patent: May 14, 2002

(54) BUSHING FOR A JET ENGINE VANE

(75) Inventors: James P. Mack; Edward J. Mack, both of Bristol, RI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/572,118

(22) Filed: May 17, 2000

Related U.S. Application Data (63) Continuation of application No. 09/233,902, filed on Jan. 20, 1999, now Pat. No. 6,086,327.

(51) Int. Cl.[7] ............................................. F01D 17/12

(52) U.S. Cl. ....................................... 384/272; 415/160

(58) Field of Search .................................. 384/275, 273, 384/272, 276, 295, 297, 296, 299, 300

(56) References Cited

U.S. PATENT DOCUMENTS

| | | |
|---|---|---|
| 3,887,297 A | 6/1975 | Welchek |
| 3,929,392 A | 12/1975 | Ogino |
| 3,966,276 A | 6/1976 | Bellarbre et al. |
| 4,498,790 A | 2/1985 | Fisher |
| 4,909,638 A | 3/1990 | Muto |
| 5,013,166 A | 5/1991 | Domer |
| 5,072,821 A | 12/1991 | Kruse et al. |
| D341,145 S | 11/1993 | Esworthy |
| 5,593,275 A | 1/1997 | Venkatasubbu et al. |
| 5,601,370 A | 2/1997 | Shibayama et al. |

FOREIGN PATENT DOCUMENTS

| | | |
|---|---|---|
| GB | 757259 | 9/1956 |

OTHER PUBLICATIONS

High Performance Plastic Parts for Critical Applications Mack Plastics Brochure (5 pp.).
Custom Manufacturing for Critical Applications Mack Plastics Brochure (6 pp.).
Thomson Nyliner Bearing Application Data Sheet and Designers Guide Thomson Industries, Inc.—1995 (6 pp.).
Literature on DU, DX, GAR–FIL and GAR–MAX Bearings Garlock Bearings, Inc.—1980 (4 pp.).
Bearing Retention Methods Rexnord (1 p.).
Bearing Retention Methods Fiberglide (1 p.).
Iges Self–Lubricated Bearing Designs—"Iglide L1" (3 pp.).

Primary Examiner—David A. Bucci
Assistant Examiner—Colby Hansen
(74) Attorney, Agent, or Firm—Nathan D. Herkcamp; Salter & Michaelson (57) ABSTRACT

A vane assembly for an engine is disclosed, the vane assembly having a vane including a blade having a spindle disposed at one end thereof and a bushing mounted on the spindle. The bushing-includes first and second half portions, each half portion having a generally semicircular body having a first finger disposed at a first end of a first side of the body, a second finger disposed at a second end of the first side of the body and a third finger disposed on a second side of the body, between the first and second-ends of the body, the first and second fingers having a distance between them which is not less than a width of the third finger. The first and second half portions are snap fit onto the spindle of the vane such that the third finger of the second half portion is located between the first and second fingers of the first half portion, and the third finger of the first half portion is located between the first and second fingers of the second half portion. Each of the first and second half portions further include a semi-annular flange disposed at the first end of the body portion, the semi-annular flange lying in a plane which is substantially perpendicular to a longitudinal axis of the body.

20 Claims, 7 Drawing Sheets

BUSHING FOR A JET ENGINE VANE

This application is a continuation of Ser. No. 09/233,902 filed Jan. 20, 1999, U.S. Pat. No. 6,086,327.

BACKGROUND OF THE INVENTION

1. Field of the Invention

The present invention relates generally to a bushing for a jet engine and more specifically to an improved,bushing which is less expensive to manufacture and which facilitates shipping and installation of the bushing.

2. Discussion of the Related Art

Jet engines generally include an axial air compressor which supplies compressed air into a combustor. The front section of a jet engine includes the axial air compressor. The axial air compressor generally includes several consecutive stages, each having a number of stator (stationary) vanes in a shroud and an equal number of rotor (rotating) vanes. Rotor vanes are designed and arranged such that, as the rotor vanes pass by the stator vanes in a particular stage, they take in a volume of air, compress the air and pass this compressed air into the next stage for further compression of the air. Some jet engines, such as the CFM56-2 turbofan engine manufactured by General Electric for example, have thirteen stages of compression. Stages 1 through 5 of this engine have stator vanes in which the pitch of the vanes is variable. The pitch of the variable stator vanes can be adjusted to vary the volume of air intake and thereby control the volume and pressure of the air that is subsequently injected into the combustor to be combined with fuel and ignited. The thrust of the engines can thereby be varied and the amount of air can be metered accurately for maximum fuel consumption. This is desirable because it provides the pilot with greater control over the amount of thrust produced within the engine at given engine speeds. For example, when the pilot is bringing the jet in for a landing, he or she can keep the engine running at very high RPMs and vary the pitch of the vanes to generate less thrust within the engine. If there is a problem and the pilot has to quickly generate thrust to pull up, he or she simply rotates the vanes of the stator to a pitch which increases the amount of air directed into the stator, thus increasing the thrust produced by the engine. The adjustable vanes allow the pilot to quickly produce thrust without having to adjust the RPMs at which the rotor is rotating.

Figure 7:
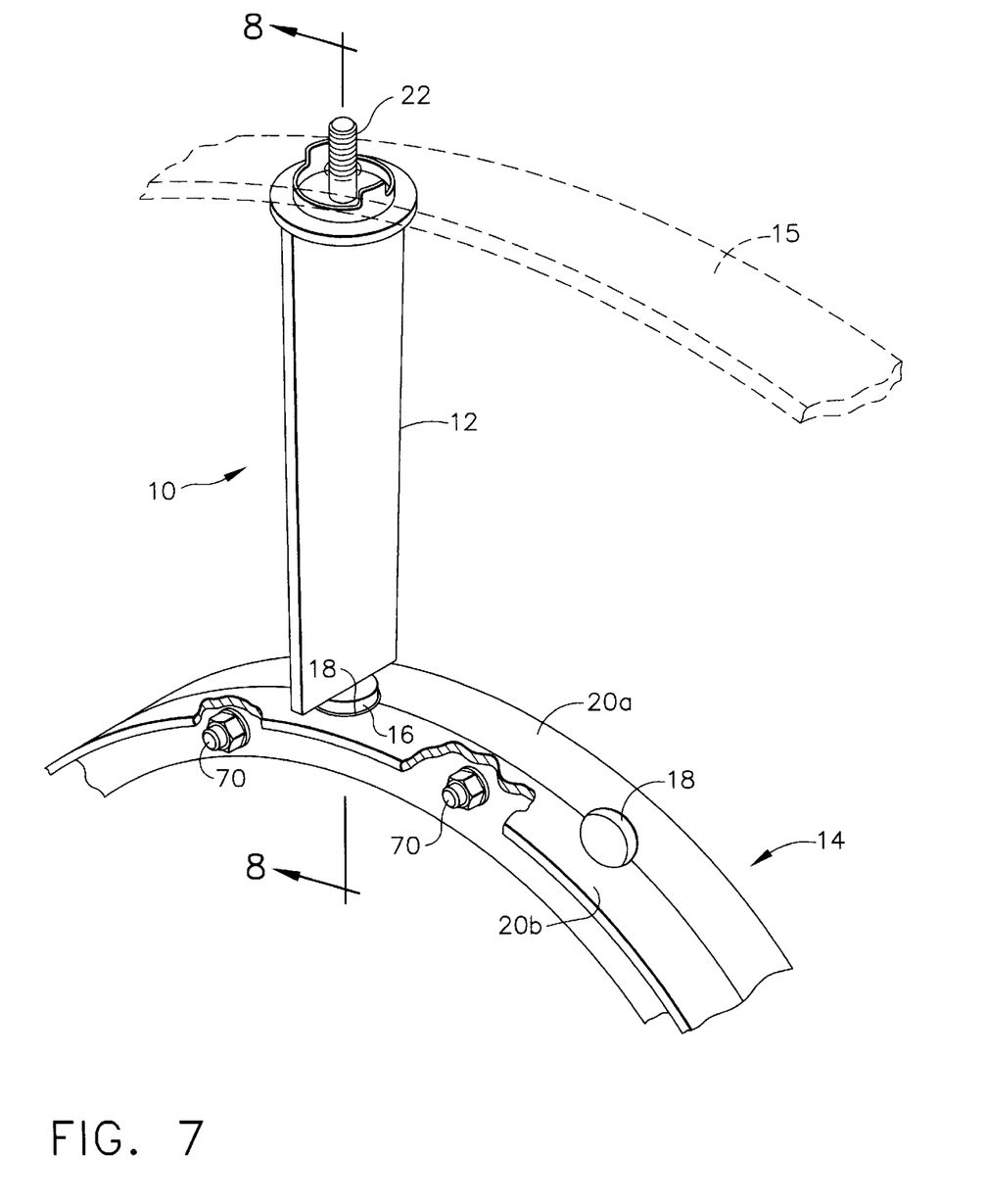
FIG. 7 is a perspective view of a vane mounted within a shroud of a jet engine.

As shown in FIG. 7, each vane 10 of the engine described above includes a blade 12 which is rotatably mounted between an inner shroud 14 and an outer shroud 15. It will be understood that each stator of a jet engine may include several stages, each having many adjustable vanes. However, for simplicity, only one vane is shown in FIG. 7. Vane 10 includes a spindle, partially shown at 16 in FIG. 7 and fully shown at 16 in FIG. 1, which is held in place between portions 20a and 20b of inner shroud 14 within aperture 18. Vane 10 also includes a drive portion 22 mounted within outer shroud 15. A steering mechanism (not shown) is coupled to the drive portion 22 to rotate the vane 10 within the inner shroud 14 and the outer shroud 15.

Figures 1, 2:
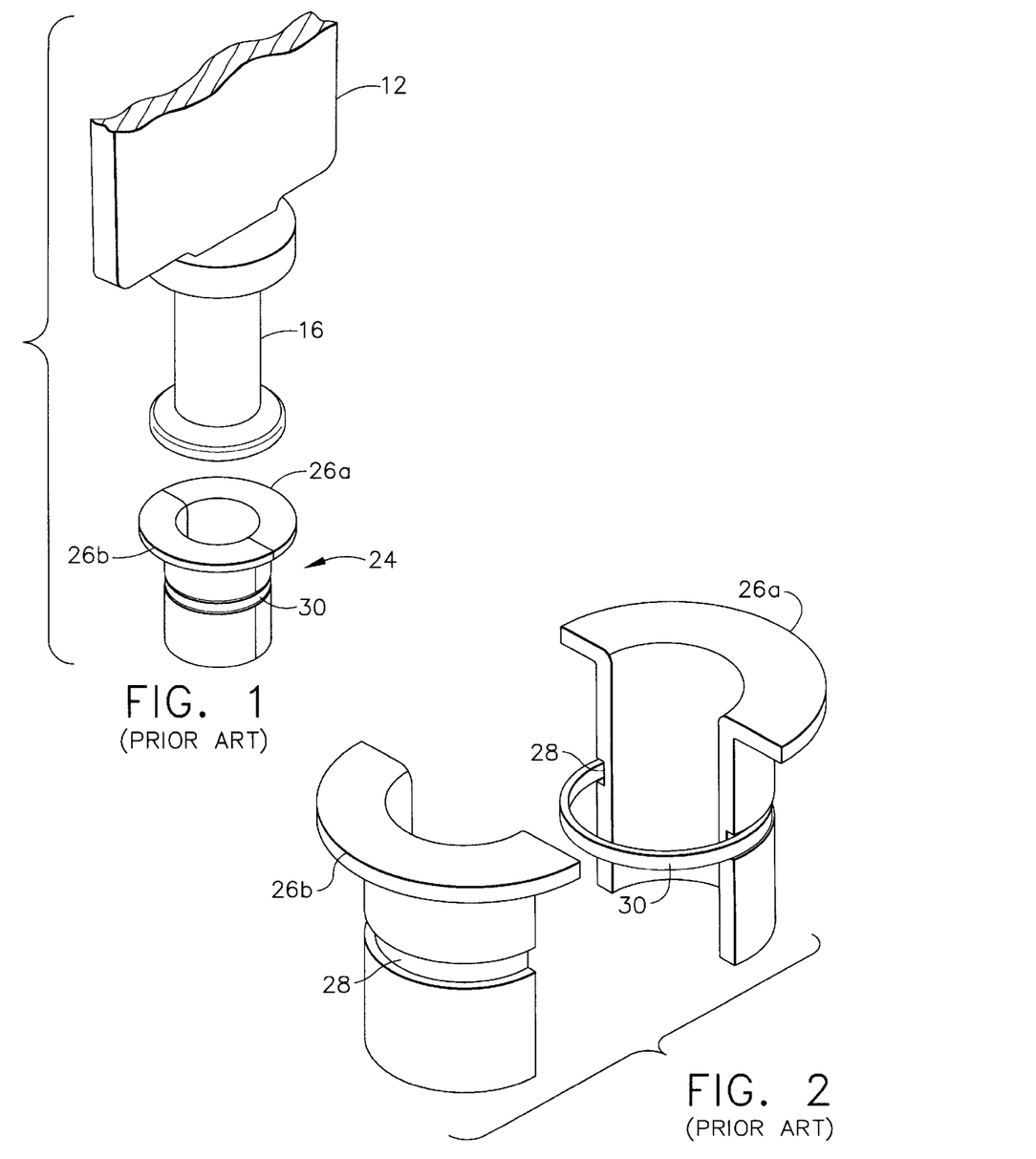
FIG. 1 is a perspective view of a prior art vane bushing, shown removed from a vane.
FIG. 2 is an exploded view of the prior art vane bushing shown in FIG. 1.

In order to facilitate the rotation of the vane 10, a bushing is mounted on spindle 16 before it is mounted between portions 20a and 20b of inner shroud 14. A prior art bushing 24 is shown in FIGS. 1 and 2. Since the operating temperature of the jet engine can reach 550° F., bushing 24 must be made from a material that can withstand the extremely high temperatures to which it will be subjected. Therefore, bushing 24 is typically formed from a plastic which is capable of withstanding these temperatures. One prior art bushing 24 is formed from a plastic material sold by DuPont under the trademark VESPEL™. However, this material is not capable of being melt processed, meaning that it cannot be used in an injection molding process to form the bushing 24. Bushing 24 is typically formed from a billet of the VESPEL™ material and is machined to the shape shown in FIG. 1, including a circumferential groove 28 (FIG. 2). The bushing 24 is then cut in half to form parts 26a and 26b. An elastic band 30, made from a high temperature-resistant material, is placed within groove 28 to hold parts 26a and 26b together on spindle 16 until the spindle is mounted to inner shroud 14, as described above.

Due to the properties of the material used in the manufacture of bushing 24, the requirement that each bushing be separately machined and the requirement for the elastic band 30, bushing 24 is very time consuming and expensive to manufacture. Shipping the bushings from the manufacturer to the end user is problematic because the three-piece bushings are prone to disassembling during shipping, thus requiring extra time for reassembling the bushing before it is installed on the vane 10. Furthermore, since each part 26a and 26b must be held in place on spindle 16 while the elastic band 30 is installed, the installation of bushing 24 on the vane 10 is very time consuming. Since, every time a jet engine is rebuilt, every vane bushing is replaced, the replacement of the bushings adds considerably to the expense and time required to rebuild an engine.

What is needed is a vane bushing for a jet engine which is simple and inexpensive to manufacture, and which is easy to ship and install on a jet engine vane.

SUMMARY OF THE INVENTION

The present invention is directed to a bushing for a jet engine vane which is injection moldable and therefore is simple and inexpensive to manufacture, and is formed into such a design which enables the bushing to. be easily shipped and installed on a jet engine vane.

According to one embodiment of the invention, a vane assembly for an engine is disclosed, the vane assembly comprising a vane comprising a blade having a spindle disposed at one end thereof and a bushing mounted on the spindle. The bushing comprises first and second half portions, each half portion having a generally semicircular body having a first finger disposed at a first end of a first side of the body, a second finger disposed at a second end of the first side of the body and a third finger disposed on a second side of the body, between the first and second ends of the body. The first and second fingers have a distance between them which is not less than a width of the third finger.

The first and second half portions are snap fit onto the spindle of the vane such that the third finger of the second half portion is located between the first and second fingers of the first half portion, and the third finger of the first half portion, is located between the first and second fingers of the second half portion.

Each of the first and second half portions further comprise a semi-annular flange disposed at the first end of the body portion, the semi-annular flange lying in a plane which is substantially perpendicular to a longitudinal axis of the body.

According to another embodiment of the invention, a vane assembly for an engine is disclosed, the vane assembly comprising a vane comprising a blade having a spindle disposed at one end thereof and a cylindrical bushing having first and second portions hingedly attached to each other.

The first portion has a first finger disposed at a first end of the bushing and a second finger disposed at a second end of the bushing, the second portion having a finger disposed at a point between the first and second ends of the bushing.

The bushing is secured on the spindle by placing one of the first and second portions on the spindle and closing the bushing around the spindle such that the finger of the second portion is located between the first and second fingers of the first portion.

According to yet another embodiment of the invention, a vane assembly for an engine is disclosed, the vane assembly including a blade having a spindle disposed at one end thereof and a bushing having a cylindrical body. The body has a slot which extends from an upper edge of the body to a lower edge of the body and a number of slits which extend from the upper edge of the body to a point between the upper and lower edges of the body, the slot and the number of slits being constructed and arranged to permit the bushing to be temporarily pried open.

The bushing is mounted on the spindle by prying the bushing open at the slot, placing the bushing around the spindle and releasing the bushing, thereby allowing the bushing to encircle the spindle.

According to yet another embodiment, a bushing is disclosed, the bushing including first and second half portions, each half portion having a substantially semicircular body, an upper end, a lower end, a first side and a second side. The first side of the body of each of the first and second half portions have an intermediate finger disposed intermediate the upper and lower ends of the body and the second side of the body of each of the first and second half portions has an upper finger disposed at the upper end of the body and a lower finger disposed at the lower end of the body. The upper and lower fingers having a distance therebetween which is no less than the width of the intermediate finger.

The first and second half portions are constructed and arranged to be snap fit onto a spindle such that the intermediate finger of the first half portion is positioned between the upper and lower fingers of the second half portion and the intermediate finger of the second half portion is positioned between the upper and lower fingers of the first half portion.

BRIEF DESCRIPTION OF THE DRAWINGS

The invention will now be described in greater detail with reference to the accompanying drawings, in which.

DETAILED DESCRIPTION

Referring now to the drawings, and more particularly to FIGS. 3–13, the vane bushing of the present invention will be described. Shown in FIGS. 3–6 is a first embodiment of a vane bushing 40 of the present invention. Bushing 40 includes two identical parts 42 which are mated together on spindle 16 to form the bushing 40. Each part 42 is injection molded in one piece from a material which, while being capable of being melted and injection molded, is also capable of withstanding the very high temperatures experienced in a jet engine once the part is formed. The material must also be machinable, since, in some cases, in order to finish the part, each part may be machined to bring it within specific tolerances. The material presently contemplated as the preferred material for this application is a combination of approximately 80% of a material sold under the trademark PEEK™ by Victrex USA, Inc. of West Chester, Pa., and approximately 20% polytetrafloroethylene (PTFE). This combination of materials allows complex shapes to be formed fairly easily and inexpensively, compared to the prior art process of machining a billet into the desired shape. However, any material which possesses the characteristics described above may be used to form the present invention.

Figures 3, 4:
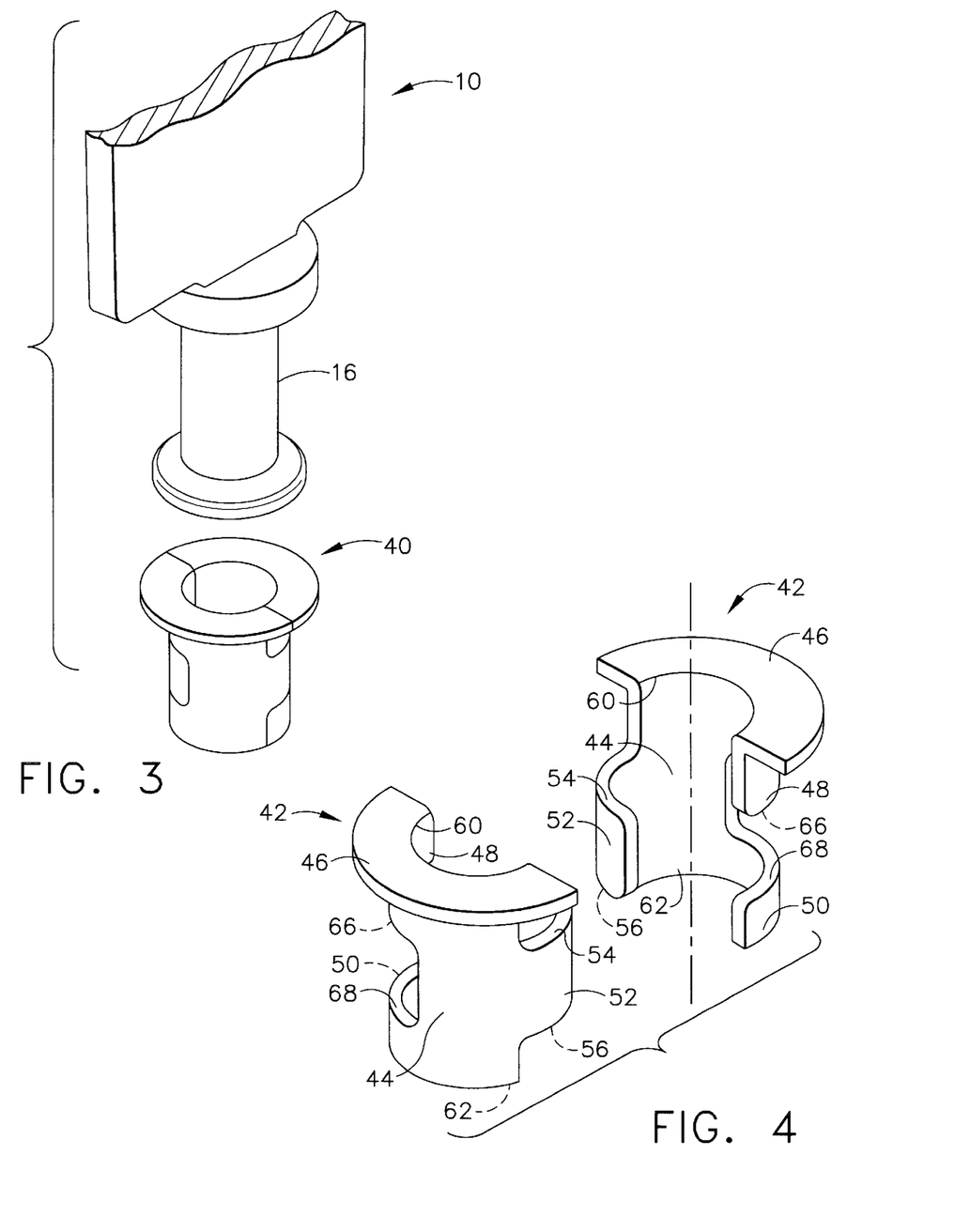
FIG. 3 is a perspective view of a vane bushing according to a first embodiment of the present invention, shown removed from a vane.
FIG. 4 is an exploded view of the vane bushing according to the first embodiment of the invention.

As shown in FIG. 4, each part 42 includes a body portion 44 and a flange portion 46. Each body portion 44 includes an upper finger 48 formed at the upper end 60 of one side of body portion 44 proximate flange portion 46 and a lower finger 50 formed at the lower end 62 of the same side of body portion 44 on which upper finger 48 is formed. On the other side of body portion 44, an intermediate finger 52 is formed at a point between the upper end 60 and lower end 62 of body portion 44. Upper finger 48 and lower finger 50 have a distance between them which is substantially the same as the width of intermediate finger 52 as defined by the distance between upper edge 54 and lower edge 56 of intermediate finger 52. However, the distance between upper finger 48 and lower finger 50 may be greater than the width of intermediate finger 52 to allow for expansion of the parts when the bushing 40 is installed on a spindle and for the accumulation of debris from the normal wear associated with the bushing 40. Upper finger 48 has a width, defined by the distance between upper end 60 of body portion 44 and lower edge 66 of upper finger 48, which is substantially the same as the distance between the upper edge 54 of intermediate finger 52 and the upper end 60 of body portion 44. Lower finger 50 has a width, defined by the distance between lower end 62 of body portion 44 and upper edge 68 of lower finger 50, which is substantially the same as the distance between the lower edge 56 of intermediate finger 52 and the lower end 62 of body portion 44. These dimensions of the fingers 48, 50 and 52 allow each part 42 of the bushing 40 to interlock with the other part 42 of the bushing 40 when it is installed on the spindle 16 of the vane 10.

Figure 5:
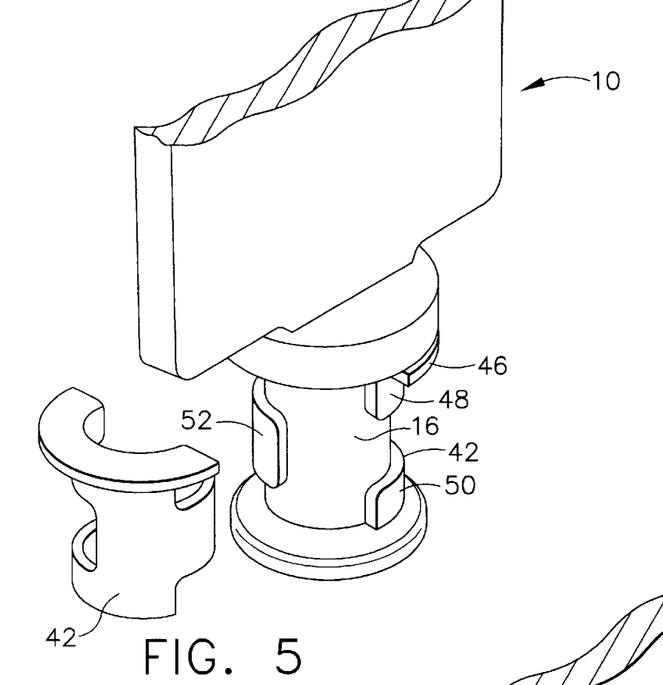
FIG. 5 is a perspective view of the vane bushing according to the first embodiment of the invention, shown partially installed on a vane.

In FIG. 5, one part 42 of bushing 40 is shown mounted on a spindle 16 of a vane 10. As shown in FIG. 5, the distance between upper and lower fingers 48 and 50 and intermediate finger 52 is less than the diameter of spindle 16. Therefore, in order to install part 42 onto spindle 16, part 42 is lined up with spindle 16 such that fingers 48, 50 and 52 are in contact with spindle 16, and part 42 is pressed onto spindle 16, causing upper and lower fingers 48 and 50 to be flexed away from intermediate finger 52 in order to allow spindle 16 to pass between upper and lower fingers 48 and 50 and intermediate finger 52. Once upper and lower fingers 48 and 50 and intermediate finger 52 pass beyond the widest part of spindle 16, upper and lower fingers 48 and 50 and intermediate finger 52 snap back into their normal positions, thereby engaging spindle 16 within part 42. Once mounted on spindle 16, upper and lower fingers 48 and 50 and intermediate finger 52 span spindle 16 approximately 270°. However, a span of approximately 250° to 280° may be used. The same process is carried out to install the other part 42 on spindle 16.

Figure 6:
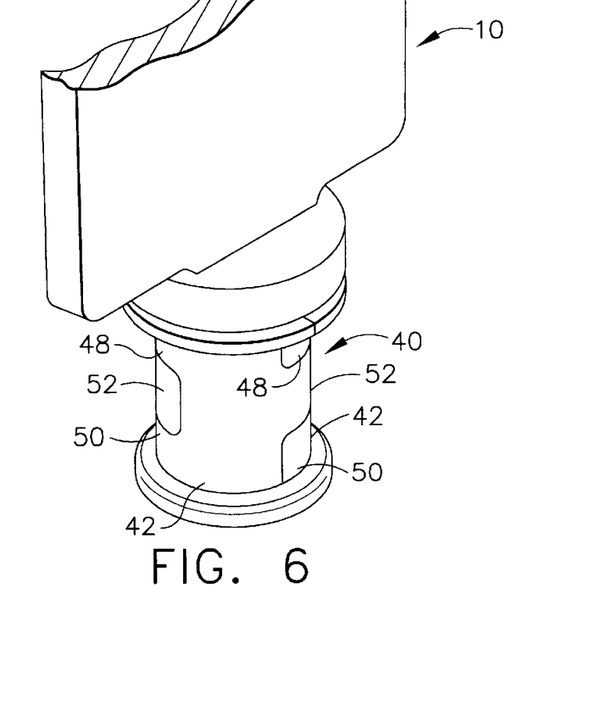
FIG. 6 is a perspective view of the vane bushing according to the first embodiment of the invention, shown fully installed on a vane.

As shown in FIG. 6, due to the configuration and size of upper and lower fingers 48 and 50 and intermediate finger 52, when both parts 42 are installed on the spindle 16, intermediate finger 52 of each part 42 fits into the gap between the upper and lower fingers 48 and 50 of the other part 42. The resulting bushing 40 completely covers the spindle 16.

Figure 8:
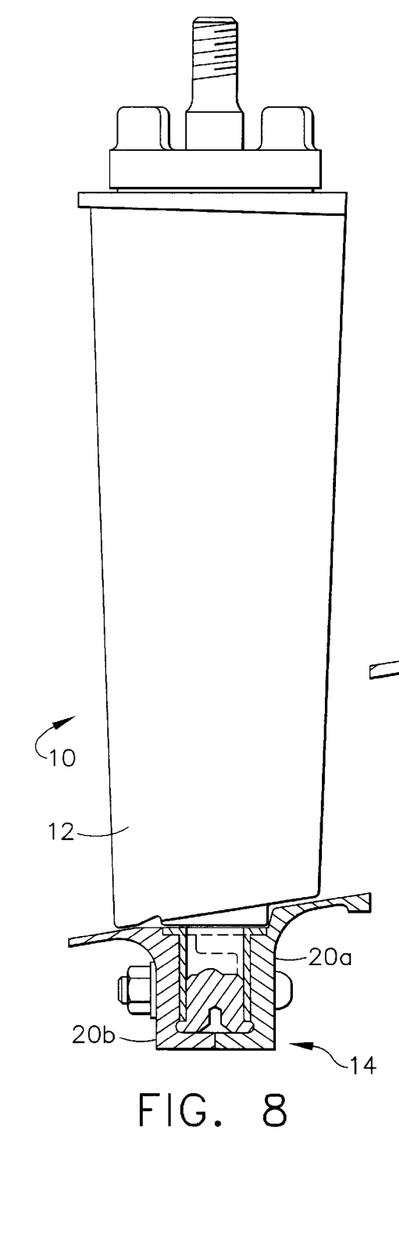
FIG. 8 is a cross-sectional view of the bushing of the first embodiment of the present invention mounted on a vane, taken along line 8—8 in FIG. 7.
Figure 8A:
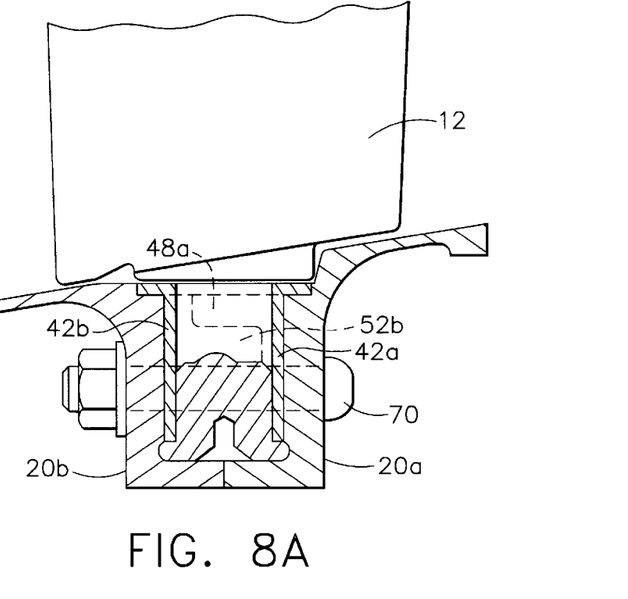
FIG. 8A is a close-up view of the bushing of the first embodiment of the present invention mounted on a vane, as shown in FIG. 8.

FIGS. 8 and 8A show cross-sectional views, taken along line 8—8 of FIG. 7, of the bushing 40 installed on a spindle 16 of a vane 10 which is mounted to inner shroud 14. Once bushing 42 is installed on 16 spindle 16, bushing 40 and spindle 16 are sandwiched between portion 20a and 20b of inner shroud 14. Portions 20a and 20b are secured together via nut and bolt assemblies 70. This assembly holds vane 10 in place, while allowing it to be rotated about spindle 16.

Since both parts 42 of this embodiment are identical, there is no need for preassembling the bushings before they are shipped, and therefore, the prior art problem of having to reassemble bushings that become disassembled during shipping has been eliminated. Furthermore, since each part 42 of bushing 40 can be separately attached to the spindle 16, the need for the elastic band to hold the prior art bushing in place on the spindle 16 has also been eliminated.

Figure 9:
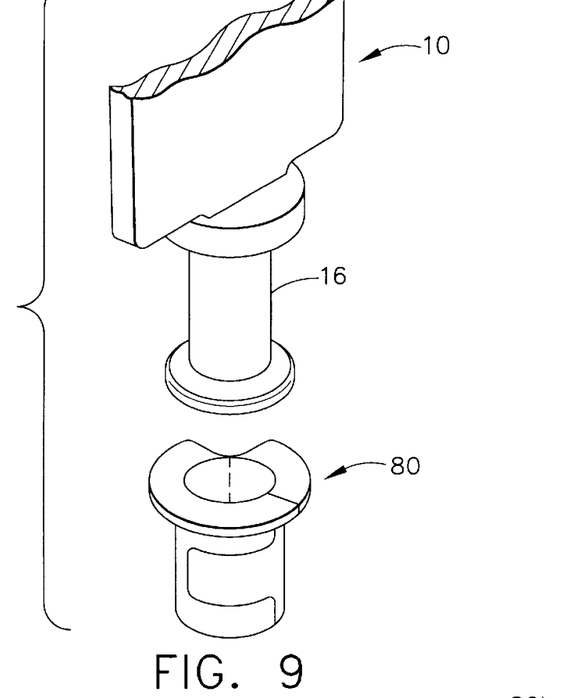
FIG. 9 is a perspective view of a vane bushing according to a second embodiment of the present invention, shown removed from a vane.
Figure 10:
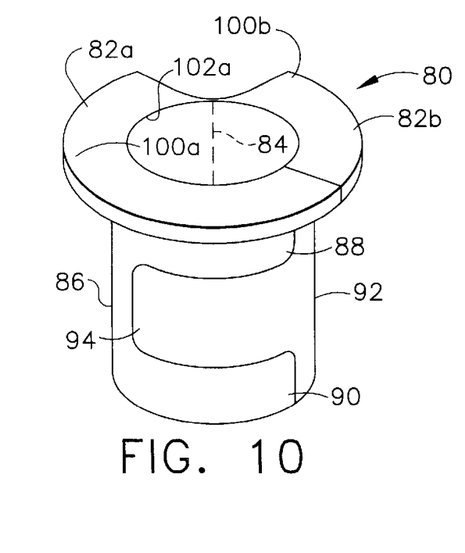
FIG. 10 is a perspective view of a vane bushing according to a second embodiment of the present invention, shown in a closed position.
Figure 11:
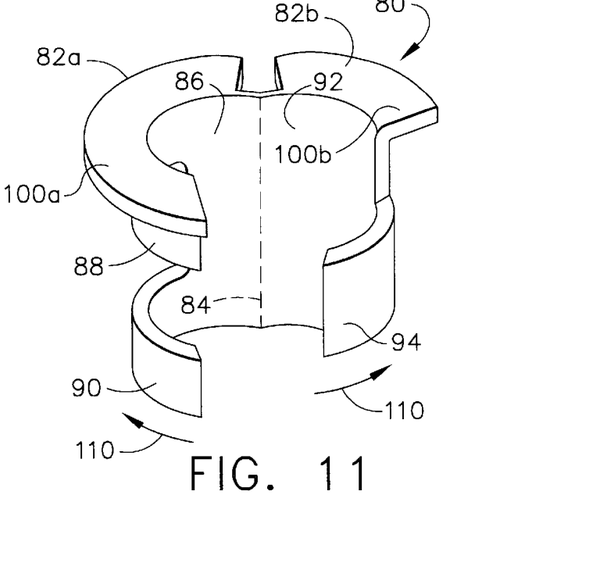
FIG. 11 is a perspective view of a vane bushing according to the second embodiment of the present invention, shown in an open position.

A second embodiment of the bushing of the present invention is shown at 80 in FIGS. 9–11. Bushing 80 may be injection molded in one piece using the same material as that used in the embodiment of FIGS. 3–6. Bushing 80 includes a first part 82a and a second part 82b which are attached to each other along a hinge 84. Preferably, hinge 84 is molded as a living hinge, which permits bushing 80 to be formed in one piece, while also providing the hinge function. As shown in FIGS. 9–11, part 82a of bushing 80 includes a body portion 86 having an upper finger 88, a lower finger 90 and a flange portion 10a, disposed along an upper end 102a of body 84 of part 82a. Part 82b of bushing 80 includes a body portion 92 having an intermediate finger 94 and a flange portion 100b, disposed along an upper end 102b of body 92 of part 82b.

Bushing 80 is formed such that the distance between hinge 84 and the ends of upper and lower fingers 88 and 90, as well as the distance between hinge 84 and the end of intermediate finger 94 is less than the diameter of spindle 16. This permits either of parts 82a and 82b to be mounted onto the spindle 16 by snap fitting the part onto the spindle.

Bushing 80 is installed on a spindle 16 by hingedly opening parts 82a and 82b as shown by arrows 110 in FIG. 11, snap fitting either of parts 82a and 82b onto the spindle 16, hingedly closing bushing 18 around the spindle 16 to snap fit the other of parts 82a and 82b onto the spindle 16. Upper and lower fingers 88 and 90 of part 82a and intermediate finger 94 of part 82b are sized and positioned such that when bushing 80 is in the closed position shown in FIG. 10, intermediate finger 94 fits between upper and lower fingers 88 and 90, thereby covering the spindle 16.

Figure 12:
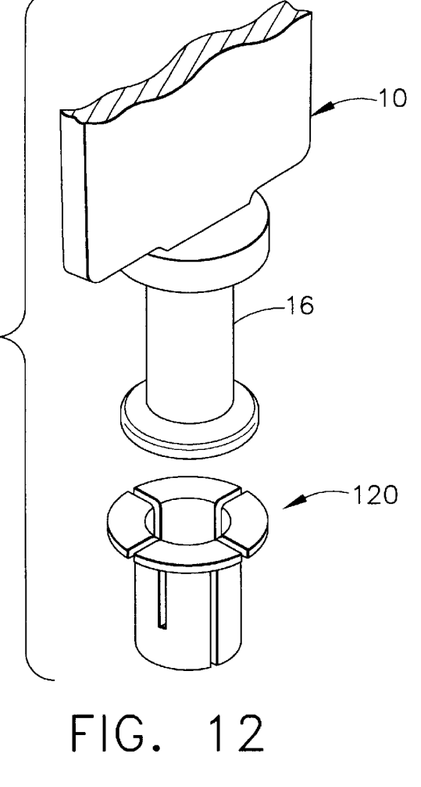
FIG. 12 is a perspective view of a vane bushing according to a third embodiment of the present invention, shown removed from a vane.
Figure 13:
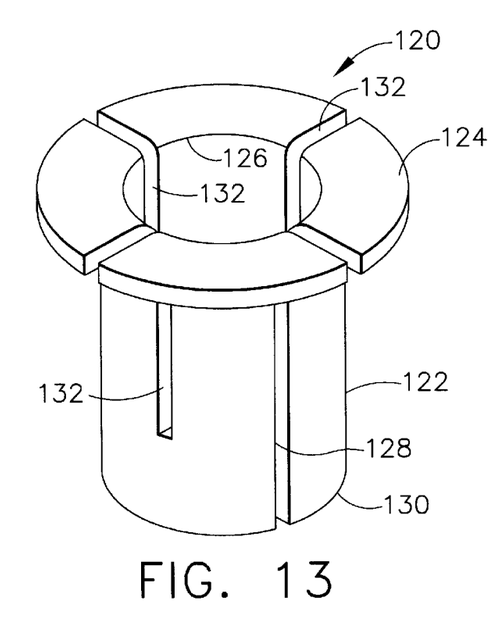
FIG. 13 is a perspective view of a vane bushing according to the third embodiment of the present invention.

A third embodiment of the bushing of the present invention is shown at 120 in FIGS. 12 and 13 Bushing 120 may be injection molded in one piece using the same material as that used in the embodiment of FIGS. 3–6 and 9–11. Bushing 120 includes a body portion 122 and a flange portion 124 disposed at an upper end 126 of body portion 122. Bushing 120 includes a slit 128 which extends completely through flange portion 124 and from upper end 126 to lower end 130 of body portion 122. Bushing 120 also includes a number of slots 132 which extend completely through flange portion 124 and from upper end 126 to a point between upper end 126 and lower end 130 of body portion 122. Slit 128, and slots 132 permit bushing 120 to be flexed open to allow the bushing 120 to be pressed onto and thereby installed on a spindle 16. Slit 128 and slots 132 also provide space for thermal expansion of the bushing 120 and for the accumulation of debris from the normal wear associated with the bushing 120.

While there is shown and described herein certain specific structures embodying the invention, it will be manifest to those skilled in the art that various modifications and rearrangements of the parts may be made without departing from the spirit and scope of the underlying inventive concept. For example, the intermediate finger of the first and second embodiments may have upper and lower edges which are tapered, rather than parallel, as shown in the figures. In such a case, the space between the upper and lower fingers would be formed to positively accept the tapered intermediate finger when the bushing is installed on a spindle. Also, while the hinge 84 of the second embodiment is disclosed as being a living hinge, it will be understood that the parts 82a and 82b may be formed separately and hingedly attached using any type of hinge structure. Furthermore, while the bushings of the present invention are described for use in connection with jet engines, the bushings may be used for any application in which a bushing having the above-described properties is desirable. Accordingly, the inventive concept is not limited to the particular forms herein shown and described except insofar as indicated by the scope of the appended claims.

What is claimed is:

1. A bushing comprising:
    a first and second half portions, each half portion having a generally semicircular body with a first finger disposed at a first end of a first side of said body, a second finger disposed at a second end of said first side of said body, and a third finger disposed on a second side of said body between said first and second ends of said body, said first and second fingers having a distance between them which is substantially a width of said third finger;
    said first and second half portions are constructed to be snap fit together such that said third finger of said second half portion is located between said first and second fingers of said first half portion, and said third finger of said first half portion is located between said first and second fingers of said second half portion, wherein said generally semicircular body of each of said first and second half portions have a span of approximately 250° to approximately 280°.

2. The bushing of claim 1, wherein each of said first and second half portions further comprise a flange disposed at one end of said body, said flange lying in a plane which is substantially perpendicular to a longitudinal axis of said body.

3. The bushing of claim 1, wherein said first and second half portions are formed from a plastic material.

4. The bushing of claim 3, wherein said plastic material comprises a mixture that includes about 20% PTFE.

5. A bushing comprising:

a first and second half portions, each half portion having a substantially semicircular body, an upper end, a lower end, a first side and a second side;

the first side of the body of each of the first and second half portions having an intermediate finger disposed intermediate said upper and lower ends of the body, said intermediate finger having a width;

the second side of the body of each of the first and second half portions having an upper finger disposed at said upper end of said body and a lower finger disposed at said lower end of said body, said upper and lower fingers having a distance therebetween which is no less than the width of said intermediate finger;

said first and second half portions are constructed and arranged to be snap fit together such that said intermediate finger of said first half portion is positioned between said upper and lower fingers of said second half portion and said intermediate finger of said second half portion is positioned between said upper and lower fingers of said first half portion;

each of said first and second half portions include a flange disposed at said upper end of said body, said flange lying in a plane which is substantially perpendicular to a longitudinal axis of said body.

6. The bushing of claim 5, wherein each of said first and second half portions having a substantially semicircular body spans approximately 250° to approximately 280°.

7. A bushing comprising:

first and second half portions, each half portion having a generally semicircular body with a first finger disposed at a first end of a first side of said body, a second finger disposed at a second end of said first side of said body, and a third finger disposed on a second side of said body between said first and second ends of said body, said first and second fingers having a distance between them which is substantially a width of said third finger;

said first and second half portions are constructed to be snap fit together such that said third finger of said second half portion is located between said first and second fingers of said first half portion, and said third finger of said first half portion is located between said first and second fingers of said second half portion;

each of said first and second half portions include a flange disposed at an end of said body, said flange lying in a plane which is substantially perpendicular to a longitudinal axis of said body.

8. The bushing of claim 7, wherein when said bushing is snap fit together, each of said first and second half portions spans approximately 270°.

9. A bushing half portion comprising:

a generally semicircular body having a first finger disposed at a first end of a first side of said body, a second finger disposed at a second end of said first side of said body and a third finger disposed on a second side of said body, between said first and second ends of said body, said first and second fingers having a distance between them which is substantially a width of said third finger;

a flange disposed at an end of said body, said flange lying in a plane which is substantially perpendicular to a longitudinal axis of said body.

10. The bushing half portion of claim 9, wherein said generally semicircular body of said half portion spans approximately 270°.

11. The bushing half portion of claim 10, wherein said half portion is formed from a plastic material.

12. The bushing half portion of claim 11, wherein said half portion is injection molded in one piece.

13. The bushing half portion of claim 13, wherein said plastic material comprises a mixture that includes PTFE.

14. The bushing half of claim 13, wherein said plastic material comprises a mixture that includes about 20% PTFE.

15. A bushing half portion, said half portion comprising:

a substantially semicircular body having an upper end, a lower end, a first side and a second side;

the substantially semicircular body spans approximately 250° to approximately 280°;

the first side of the body having an intermediate finger disposed intermediate said upper and lower ends of the body, said intermediate finger having a width; and the second side of the body having an upper finger disposed at said upper end of said body and a lower finger disposed at said lower end of said body, said upper and lower fingers having a distance therebetween which is no less than, the width of said intermediate finger.

16. The bushing half portion of claim 15, wherein said half portion further comprises a flange disposed at an end of said body, said flange lying in a plane which is substantially perpendicular to the longitudinal axis of said body.

17. The bushing half portion of claim 16, wherein said half portion is formed from a plastic material.

18. The bushing half portion of claim 17, wherein said plastic material comprises a mixture that includes PTFE.

19. The bushing half portion of claim 18, wherein said plastic material comprises a mixture that includes about 20% PTFE.

20. The bushing half portion of claim 17, wherein said half portion is injection molded in one piece.

* * * * *